US006330520B1

(12) United States Patent
Dziulko et al.

(10) Patent No.: US 6,330,520 B1
(45) Date of Patent: Dec. 11, 2001

(54) TENNIS SERVICE WATCHES FOR INSTANTANEOUS DISPLAY OF THE VELOCITY OF THE SERVICE BALL

(76) Inventors: Adolphe Richard Dziulko, 62 avenue da General de Gautle, F-94170 Le Perreux (FR); Alice Wanda Dziulko, Villa l'Ensoleillee, avenue des Chenes, F-06100 Nice (FR)

( * ) Notice: Subject to any disclaimer, the term of this patent is extended or adjusted under 35 U.S.C. 154(b) by 0 days.

(21) Appl. No.: 09/091,484

(22) PCT Filed: Oct. 21, 1997

(86) PCT No.: PCT/FR97/01885

§ 371 Date: Jun. 19, 1998

§ 102(e) Date: Jun. 19, 1998

(87) PCT Pub. No.: WO98/18062

PCT Pub. Date: Apr. 30, 1998

(30) Foreign Application Priority Data

Oct. 22, 1996 (FR) .................................................. 96 12801

(51) Int. Cl.[7] ..................................................... G01P 11/00

(52) U.S. Cl. .......................... 702/142; 702/149; 702/160; 73/488; 368/2; 368/10; 368/110

(58) Field of Search .................................... 702/142, 149, 702/160, 127; 73/488, 490, 491, 506, 510; 368/2, 10, 110

(56) References Cited

U.S. PATENT DOCUMENTS

| | | | | |
|---|---|---|---|---|
| 4,371,945 | * | 2/1983 | Karr et al. | 702/160 |
| 4,780,864 | * | 10/1988 | Houlihan | 368/10 |
| 4,887,249 | * | 12/1989 | Thinesen | 368/10 |
| 4,959,807 | * | 9/1990 | Thompson et al. | 702/149 |
| 5,163,014 | * | 11/1992 | Calimeri | 702/149 |
| 5,864,061 | * | 1/1999 | Dilz, Jr. | 73/488 |

* cited by examiner

*Primary Examiner*—Marc S. Hoff
*Assistant Examiner*—Hien Vo
(74) *Attorney, Agent, or Firm*—Armstrong, Westerman, Hattori, McLeland & Naughton, LLP

(57) ABSTRACT

A wrist watch which instantaneously displays the velocity of the service ball in kilometers or miles for its manual or electronic display during competitions.

6 Claims, 1 Drawing Sheet

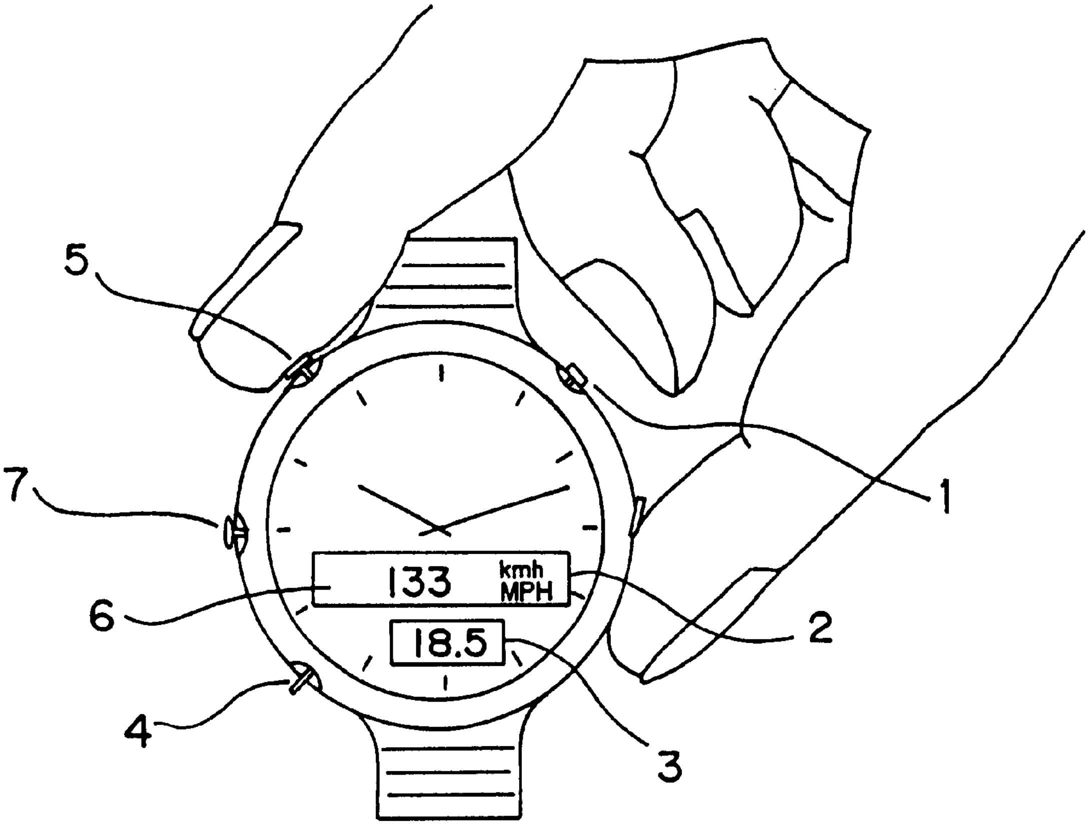
5
7
1
133
kmh
MPH
6
2
18.5
4
3

TENNIS SERVICE WATCHES FOR INSTANTANEOUS DISPLAY OF THE VELOCITY OF THE SERVICE BALL

BACKGROUND OF THE INVENTION

It is important for the player and the spectator to know the speed of the serve ball. Radar installations are not within the reach of the majority of tennis clubs, and amateurs wish to know their performances.

BRIEF SUMMARY OF THE INVENTION

The present invention concerns a wristwatch which allows immediate reading of the speed. The watch of the present invention is independent of the system which calculates this speed, and is only a practical and elegant support.

BRIEF DESCRIPTION OF THE DRAWINGS

FIG. 1 is a front view of the watch of the present invention.

DETAILED DESCRIPTION OF THE INVENTION

This is how the spectator should operate the watch of FIG. 1. Each pressure on the push-button (1) allows to display alternatively the calculated distance in kilometers or in miles in display (2). The distance covered by the ball is shown as 18 m50 in display (3) and is selected thorough a side push-button (4) which allows to scroll the distances in one direction or the other. Then, the spectator presses push-button (5) a first time at the moment when the racket hits the ball and a second time when the ball touches the serve square. The watch, which includes a system of microprocessors and software, stores this interval in memory, and after a simple calculation, displays the speed in kilometers as shown by (6). The visualization in miles requires an additional division by 1,609. The results are rounded to the closest kilometer or mile number. For a time of one second the calculation is 18.5×1×3600=67 kmh, or 41 miles. In the case of an aborted serve, one push on the push-button (7) annuls the calculations. In any event, the display is erased automatically after ten seconds without manipulation.

This watch can be used in other games and sports with distances up to 100 meters and up to a time of one minute, in athletics, cycling, golf etc. The results during a competition can be displayed in a matter of seconds by a manual display panel or by electronic means with telecontrol.

What is claimed is:

1. A device in the form of a wristwatch allowing instant knowledge and visualization of a speed of a serve ball, comprising

- a system of microprocessors and software which calculate this speed based on a reference distance covered by the ball and a time needed to cover that distance,
- a first numerical display on which this speed is visualized in kilometers or in miles,
- a second numerical display on which the reference distance covered by the ball is visualized,
- a scrolling side-press-button, wherein distances scroll in one direction or the other in the second numerical display when said scrolling side-press-button is actuated to select the reference distance among several reference distances stored in the device during operation of the device, and
- a watch which is independent from the system of microprocessors and software and the numerical displays, and constitutes only a practical support.

2. Device according to claim 1, further comprising a push-button which alternates, at each press, display of the speed in the metric system and in the mile system.

3. Device according to claim 1, wherein one of the reference distances stored in the device is 18,50 m.

4. Device according to claim 1, wherein the time elapsed between two successive pushes on the push-button at a moment when a racket hits the ball and at a moment when the ball touches a serve square is used by the system of microprocessors and software to calculate the speed in the metric system or in the mile system.

5. Device according to claim 1, further comprising a push-button to annul the calculations in course.

6. Device according to claim 1, further comprising a manual or electronic information panel to communicate the speed to a public.

* * * * *